(12) United States Patent
Bourlon et al.

(10) Patent No.: US 10,688,980 B2
(45) Date of Patent: Jun. 23, 2020

(54) ELECTROMAGNETIC BRAKE CALLIPER COMPRISING A REDUCED FRICTION PISTON GUIDE

(71) Applicant: FOUNDATION BRAKES FRANCE, Drancy (FR)

(72) Inventors: Philippe Bourlon, Dammartin en Goele (FR); Cyril Cubizolles, Drancy (FR); Marc Ayache, Clemont de L'oise (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 10 days.

(21) Appl. No.: 16/090,447

(22) PCT Filed: Apr. 3, 2017

(86) PCT No.: PCT/EP2017/057800
§ 371 (c)(1),
(2) Date: Oct. 1, 2018

(87) PCT Pub. No.: WO2017/174477
PCT Pub. Date: Oct. 12, 2017

(65) Prior Publication Data
US 2019/0118789 A1   Apr. 25, 2019

(30) Foreign Application Priority Data

Apr. 4, 2016  (FR) ...................... 16 52940

(51) Int. Cl.
*F16D 65/18* (2006.01)
*B60T 13/74* (2006.01)
(Continued)

(52) U.S. Cl.
CPC .......... *B60T 13/741* (2013.01); *F16D 55/226* (2013.01); *F16D 65/0068* (2013.01);
(Continued)

(58) Field of Classification Search
CPC ............. F16D 2121/24; F16D 2125/06; F16D 2125/40; F16H 2025/204
See application file for complete search history.

(56) References Cited

U.S. PATENT DOCUMENTS

| 4,865,162 | A | 9/1989 | Morris et al. | |
| 5,322,146 | A | 6/1994 | Holl et al. | |
| 6,318,516 | B1 * | 11/2001 | Zernickel | B60T 13/741 188/157 |
| 6,340,077 | B1 * | 1/2002 | Schaffer | B60T 13/741 188/156 |

(Continued)

FOREIGN PATENT DOCUMENTS

FR      2 688 460 A1    9/1993

OTHER PUBLICATIONS

International Search Report dated Jul. 18, 2017, in PCT/EP2017/057800 filed Apr. 3, 2017.

(Continued)

*Primary Examiner* — Bradley T King
(74) *Attorney, Agent, or Firm* — Oblon, McClelland, Maier & Neustadt, L.L.P.

(57) ABSTRACT

A brake caliper, including a caliper body including a base bearing a piston with a cylindrical external face and a movement conversion mechanism for moving this piston translationally in a main direction, this base including a cylindrical internal face in which the piston slides. The caliper includes three steel rollers interposed between the internal face of the base and the external face of the piston while being oriented along the main axis and distributed about this axis. Each roller is housed in a groove formed at the internal face of the base parallel to the main axis while being open radially towards the main axis, each cylinder extending out of this groove towards the main axis.

8 Claims, 2 Drawing Sheets

(51) Int. Cl.
  *F16D 55/226* (2006.01)
  *F16D 65/00* (2006.01)
  F16D 121/24 (2012.01)
  F16D 125/40 (2012.01)
  F16D 125/06 (2012.01)
  F16D 55/00 (2006.01)

(52) U.S. Cl.
  CPC ...... *F16D 65/18* (2013.01); *F16D 2055/0016* (2013.01); *F16D 2121/24* (2013.01); *F16D 2125/06* (2013.01); *F16D 2125/40* (2013.01)

(56) References Cited

U.S. PATENT DOCUMENTS

| | | | | |
|---|---|---|---|---|
| 6,889,800 | B2 * | 5/2005 | Halasy-Wimmer | F16D 65/18 188/162 |
| 2010/0296764 | A1 * | 11/2010 | Strandell | C21D 1/10 384/625 |
| 2015/0260220 | A1 * | 9/2015 | Owada | F16C 29/045 384/53 |
| 2015/0354645 | A1 * | 12/2015 | Cann | F16D 65/18 188/72.4 |
| 2017/0152926 | A1 * | 6/2017 | Ikeda | F16H 55/17 |

OTHER PUBLICATIONS

French Search Report dated Nov. 22, 2016, in France Patent Application 1652940 filed Apr. 4, 2016.
U.S. Appl. No. 16/063,563, filed Aug. 14, 2018, Bourlon, Philippe et al.

* cited by examiner

ELECTROMAGNETIC BRAKE CALLIPER COMPRISING A REDUCED FRICTION PISTON GUIDE

TECHNICAL FIELD

The invention relates to a motor vehicle disc brake, of the electromechanical type, in other words comprising an electromechanical actuator to press one or more plates against the disc in order to generate braking.

PRIOR ART

More specifically, the invention relates to a disc brake comprising a disc overlapped by a caliper supporting the friction plates and a piston to press these plates against the disc, as well as an electromechanical actuator actuating this piston. In practice, the caliper comprises a caliper body to which the electromechanical actuator is rigidly attached.

The caliper body includes a base supporting the piston and a plate pushed by this piston, this base being extended by an arch extended by fingers supporting a plate opposite, the brake disc being situated between these two plates.

This caliper body is typically mounted floating by being supported by a support to move freely in translation along a main axis oriented transversally with respect to the vehicle equipped with this caliper, and which corresponds to the revolution axis of the disc and to the translation axis of the piston.

The base comprises a housing wherein are mounted the piston and a mechanism for transforming movement to generate a translation of the piston on rotation of an output member of the actuator coupled with this mechanism.

This housing is delimited by an inner cylindrical face wherein the piston is mounted sliding. Given the significant forces having to be supported by the caliper body, this is generally a part coming from moulding, so as to have an increased rigidity.

Such that the sliding of the piston in the housing of the base is sufficiently precise, the inner face of this base is machined or drilled after moulding the caliper body, to have a diameter very close to the diameter of the piston.

However, the guide of this piston can lead to significant friction which can damage the correct functioning thereof, such that it is necessary that the drilling is carried out with a very high precision, which significantly increases the production cost of such a caliper.

The aim of the invention is to find a solution to reduce friction between the base and the piston of such an electromagnetic brake caliper at a lower cost.

SUMMARY OF THE INVENTION

To this end, the invention aims for an electromagnetic brake caliper for a motor vehicle, comprising a caliper body including a base supporting a piston with a generally cylindrical outer face and a mechanism for transforming movement, to move this piston in translation along a main direction on rotation of an electromechanical actuator coupled with this mechanism, this base comprising a generally cylindrical inner face, wherein the piston slides along the main axis, this caliper comprising at least three cylindrical rollers made of steel, interposed between the inner face of the base and the outer face of the piston, these roller being oriented along the main axis and distributed around this axis, each roller being housed in a groove formed on the inner face of the base, each groove extending parallel to the main axis by being radially opened towards the main axis, each cylinder exceeding this groove towards the main axis.

With this arrangement the piston is guided by the rollers without being in contact with the inner cylindrical face, which significantly decreases the friction forces to which it is subjected, because of the significant reduction in contact surfaces necessary for the guiding of the piston.

The invention also relates to a caliper thus defined, wherein each steel roller is a roller bearing roller.

The invention also relates to a caliper thus defined, comprising three cylindrical rollers distributed at one hundred and twenty degrees around the main axis.

The invention also relates to a caliper thus defined, wherein the piston comprises, on the outer face thereof, at least one groove oriented along the main axis, and wherein at least one roller is housed in a groove of the inner face and in the groove of the outer face of the piston.

The invention also relates to a caliper thus defined, wherein the rollers are blocked in translation in the grooves of the inner face of the base by a ring seal engaged in a circumferential groove of the inner face of the base.

The invention also relates to a motor vehicle brake comprising a caliper such as defined in one of the preceding claims.

DETAILED DESCRIPTION OF SPECIFIC EMBODIMENTS

Figure 1:
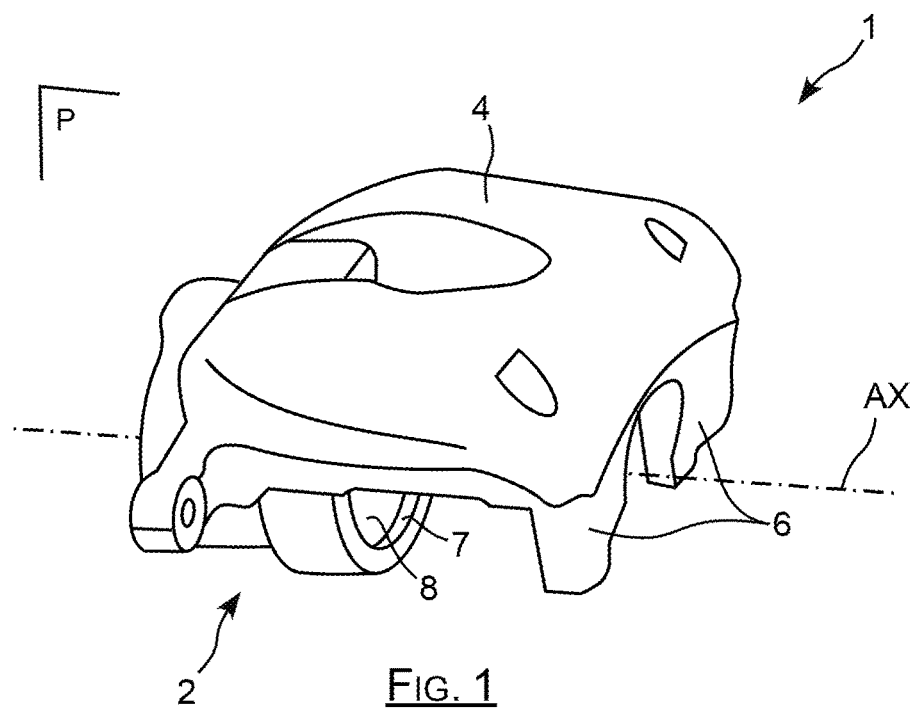
FIG. 1 is a perspective overview of a caliper body according to the invention.

The brake caliper body 1 which is represented on FIG. 1 comprises a base 2 extended by an arch 4 extended by fingers 6. The base 2 comprises a housing 7 wherein a mobile piston is engaged to press a plate on a braking disc, by being mobile along a main axis AX.

This base 2 again closes in the rear region of the housing 7 thereof, a mechanism for transforming movement with helicoidal connection, to convert a rotation movement into a translation movement of the piston, which corresponds to converting a force moment into a pressing force.

The idea that the invention is based on, is to place on the inner face of the housing, steel rollers oriented along the main axis AX to guide the piston in translation without it being in contact with this inner face. The contact surface necessary for the guiding is thus highly reduced, which enables to significantly decrease friction.

Figure 2:
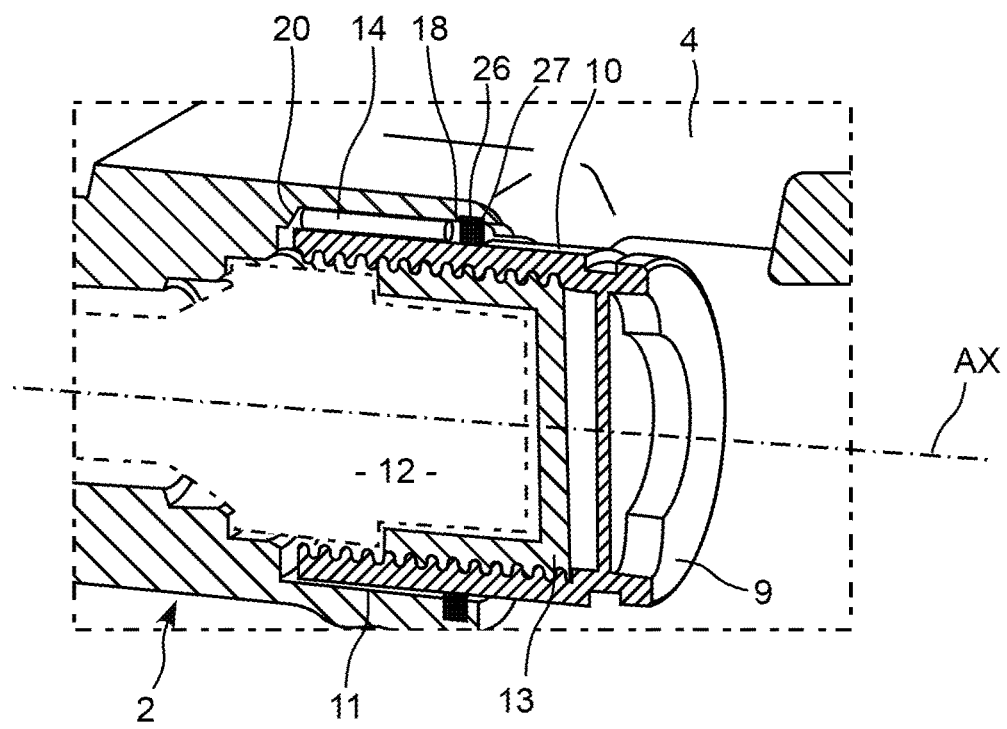
FIG. 2 is a perspective and cross-section view along a plane passing through the translation axis of the piston showing the base of a caliper body according to the invention with the housing thereof and the piston thereof, as well as the mechanism thereof for transforming movement.

As can be seen in FIG. 2, the piston 9 is engaged in a portion of the housing of the base 2 delimited by a generally cylindrical inner face 11. This piston 9 is moved by a mechanism for transforming movement comprising a reducer 12 driving a threaded cap 13 situated in the piston 8 by being screwed into an inner thread of this piston 9.

Figure 3:
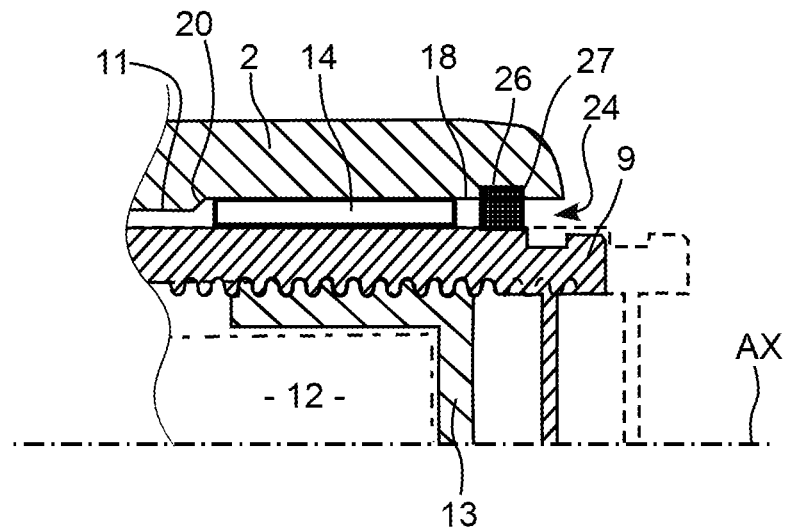
FIG. 3 is a partial section view along a plane passing through the translation axis of the piston showing the base of a caliper body according to the invention with the housing thereof and the piston thereof, as well as the mechanism thereof for transforming movement.
Figure 4:
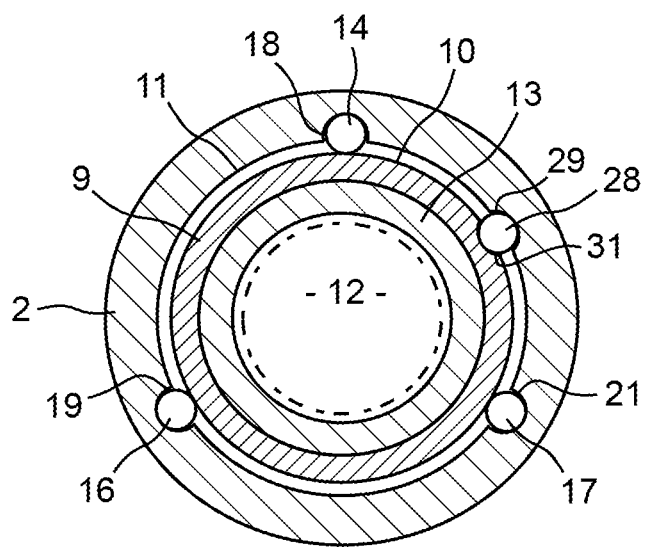
FIG. 4 is a cross-section view of the base with the piston thereof and the mechanism thereof.

The inner face 11 of the base supports three steel roller, one of which can be seen in FIGS. 2 and 3 by being referenced there with 14, the two other rollers appearing in FIG. 4, where they are referenced with 16 and 17. These steel rollers are oriented parallel to the axis AX by being spaced by one hundred and twenty degrees against each other around this axis, as can be seen in FIG. 4. Other numbers of rollers and the corresponding spacing angles can also be considered.

These steel rollers 14, 16, 17 are advantageously needle bearing rollers, so as to have a geometric conformity and an outer surface state, enabling them to ensure a precise guiding of the piston 9 in translation along the axis AX with minimum friction.

The roller 14 is housing in a groove 18 with a substantially hemicylindrical section extending parallel to the axis AX, and which is opened over the whole of the length thereof towards this axis AX, such that half of the roller 14 is housed in this groove 18.

As can be seen in FIG. 4, the roller 14 is housed in the groove 18, and it has a generator, opposite the groove 18, which is supported on the outer face 10 thereof of the piston 9, which is itself also generally cylindrical.

Similarly, the rollers 16 and 17 are housed in the corresponding cylindrical grooves 19, 21 formed on the inner face 11 of the base to themselves also each have a generator supported on the outer face 19 of the piston 9, so as to guide it.

The piston 9 is thus guided in translation with respect to the base 2 without being in direct contact with the inner face 11 of this base 2. It is only guided by the rollers which have a limited contact surface, enabling to reduce the guide forces.

The housing 7, of which one part is delimited by the generally cylindrical inner surface 11, comprises an opening 19 leading in the direction of the fingers 6 of the caliper to receive the piston 9. In the example of the figures, the caliper body is moulded such that the grooves 18, 19 and 21 have a closed end of the side opposite the opening 19 and an open end, in other words, leading to this opening 19 in the direction of the fingers 6. The end of the groove 18 which is closed is referenced with 22 in FIGS. 2 and 3.

The inner surface 11 comprises near the leading opening 24 thereof, an inner circumferential groove 26 with a square section and having a depth greater than the depth of the grooves 18, 19, 21, to receive a seal 27 which here is a ring seal with a square section.

As can be seen in FIGS. 2 and 3, when this ring seal 27 is in place in the circumferential groove 26 thereof, it blocks the section of each groove 18, 19, 21 to close the ends of these grooves situated near the opening 19.

Under these conditions, the roller 14 is radially housed in the groove 18, and is blocked along the axis AX between, on the one hand, the ring seal 27 and, on the other hand, the end 22 opposite this groove which is closed because of the shape thereof, such as directly coming from the moulding of the caliper body.

This ring seal with a square section 27 has moreover the inner face thereof, which is supported on the outer face of the piston, such that it constitutes a barrier interposed between the outer face of the piston 9 and the inner face 11 of the base 2, which enables to avoid dust and dirt entering into the space separating these faces.

In the example of FIG. 4, the caliper body comprises an additional roller 28 oriented along the axis AX, and which is jointly housed in a groove 29 of the inner face 11 and in a groove 31 of the outer face 19 of the piston 9 so as to forbid a rotation of this piston around the axis AX when it undergoes a torque applied by the reducer 12 and the cap 13.

In the example of FIG. 4, it is an additional roller 28 which is specifically intended for blocking in rotation, but one or more of the rollers ensuring the guiding of the piston can also ensure the blocking in rotation of this piston.

NOMENCLATURE

1: brake caliper body
2: base
4: arch
6: fingers
7: housing
9: piston
10: outer face
11: inner face
12: reducer
13: threaded cap
14: roller
16: roller
17: roller
18: groove
19: groove
21: groove
22: end
24: opening
26: groove
27: ring seal
28: additional roller
29: groove
31: groove

The invention claimed is:

1. An electromechanical brake caliper, comprising
a caliper body including a base supporting a piston with a cylindrical outer face and a mechanism for transforming movement to move said piston in translation along a main direction on rotation of an electromechanical actuator coupled with said mechanism;
said base including a cylindrical inner face wherein the piston slides along a main axis of the base;
said caliper comprising at least three cylindrical steel rollers interposed between the inner face of the base and the cylindrical outer face of the piston;
said rollers being oriented along the main axis and distributed around this axis;
each roller of said at least three cylindrical steel rollers being housed in a groove formed on the inner face of the base;
each said groove extending parallel to the main axis and being radially opened towards the main axis; and
each roller of said at least three cylindrical steel rollers extending further towards the main axis than the respective groove,
wherein a first roller of the at least three cylindrical steel rollers contacts a radially outermost surface of the cylindrical outer face of the piston.

2. The caliper according to claim 1, wherein each of the at least three cylindrical steel roller is a needle bearing roller.

3. The caliper according to claim 1, wherein the three cylindrical steel rollers are distributed around the main axis such that the three cylindrical steel rollers are spaced from each other by 120 degrees.

4. The caliper according to claim 1, wherein the outer face of the piston includes at least one groove oriented parallel to the main axis, and wherein a second roller of the at least three cylindrical steel rollers is housed in the respective groove of the inner face and in the at least one groove of the outer face of the piston.

5. The caliper according to claim 1, wherein each of the at least three cylindrical steel rollers are blocked in translation in the grooves of the inner face of the base by a ring seal engaged in a circumferential groove of the inner face of the base.

6. A motor vehicle brake comprising the caliper according to claim 1.

7. The caliper according to claim 1,
wherein the at least three cylindrical steel rollers includes the first roller, a second roller, a third roller, and a fourth roller,
wherein the first roller, the second roller, and the third roller are spaced from each other by 120 degrees around the main axis, and
wherein the fourth roller is disposed in a groove in the outer surface of the piston and in a groove in the inner surface of the base and the fourth roller is disposed between two of the first, the second, and the third rollers.

8. The caliper according to claim 1, wherein the first roller of the at least three cylindrical steel rollers contacts a non-grooved portion of the outer face of the piston.

* * * * *